US007699235B2

(12) United States Patent
Baba et al.

(10) Patent No.: US 7,699,235 B2
(45) Date of Patent: *Apr. 20, 2010

(54) RFID TAG, RFID-TAG ANTENNA, RFID-TAG ANTENNA SHEET, AND METHOD OF MANUFACTURING RFID TAG

(75) Inventors: Shunji Baba, Kawasaki (JP); Naoki Ishikawa, Kawasaki (JP); Hiroshi Kobayashi, Kawasaki (JP); Takatoyo Yamakami, Kawasaki (JP); Masumi Katayama, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/222,938

(22) Filed: Aug. 20, 2008

(65) Prior Publication Data

US 2008/0314993 A1    Dec. 25, 2008

Related U.S. Application Data

(63) Continuation of application No. 10/998,138, filed on Nov. 29, 2004.

(30) Foreign Application Priority Data

Aug. 31, 2004   (JP)   .............................. 2004-253458

(51) Int. Cl.
*G06K 19/06* (2006.01)
(52) U.S. Cl. .................... 235/492; 235/451; 340/572.01
(58) Field of Classification Search ................. 235/492, 235/451; 340/572.01, 472.04, 10.01
See application file for complete search history.

(56) References Cited

U.S. PATENT DOCUMENTS

| 4,658,264 | A | 4/1987 | Baker ......................... 343/895 |
| 5,786,626 | A | 7/1998 | Brady et al. ................. 257/673 |
| 6,094,138 | A | 7/2000 | Eberhardt et al. ......... 340/572.1 |
| 6,407,669 | B1 | 6/2002 | Brown et al. ............ 340/572.1 |
| 7,141,451 | B2 | 11/2006 | Tsunoda et al. ............. 438/113 |
| 2001/0043162 | A1 | 11/2001 | Babb ......................... 343/895 |
| 2005/0040994 | A1 | 2/2005 | Mazoki et al. .............. 343/809 |

(Continued)

FOREIGN PATENT DOCUMENTS

CN    1839516    9/2006

(Continued)

OTHER PUBLICATIONS

Chinese Office Action issued on a corresponding application of parent application mailed Apr. 11, 2008 with English translation (11 pages).

(Continued)

*Primary Examiner*—Karl D. Frech
(74) *Attorney, Agent, or Firm*—Kratz, Quintos & Hanson, LLP

(57) ABSTRACT

A radio-frequency-identification tag antenna includes a film base, a plurality of antenna patterns for transmission and reception, which is formed in parallel on the film base, and a cut line that is formed on the film base between adjacent antenna patterns along the antenna patterns from an inside to an outer edge of the film base. A part of the film base on which the antenna patterns are formed is folded or bent in a predetermined direction using the cut line.

18 Claims, 18 Drawing Sheets

U.S. PATENT DOCUMENTS

| | | | |
|---|---|---|---|
| 2006/0027666 A1 | 2/2006 | Glaser | 235/492 |
| 2007/0046475 A1 | 3/2007 | Carrender | 340/572.7 |
| 2007/0095922 A1 | 5/2007 | Kawai | 235/492 |

FOREIGN PATENT DOCUMENTS

| | | |
|---|---|---|
| JP | 5-191130 | 7/1993 |
| JP | 10-13296 | 1/1998 |
| JP | 11-134459 | 5/1999 |
| JP | 11-513856 | 11/1999 |
| JP | 2000-57289 | 2/2000 |
| JP | 2001-094322 | 4/2001 |
| JP | 2001-143029 | 5/2001 |
| JP | 2001-196819 | 7/2001 |
| JP | 2001-236479 | 8/2001 |
| JP | 2003-78320 | 3/2003 |
| KR | 10-0437007 | 5/2006 |
| TW | 589765 | 6/2004 |
| WO | WO 97/15093 | 10/1996 |
| WO | WO 00/16286 | 3/2000 |
| WO | WO 01/75772 | 10/2001 |

OTHER PUBLICATIONS

Japanese Office Action dated Sep. 9, 2008, which includes a partial English-language translation.

Decision of patent granted mailed Mar. 24, 2009.

FIG.1
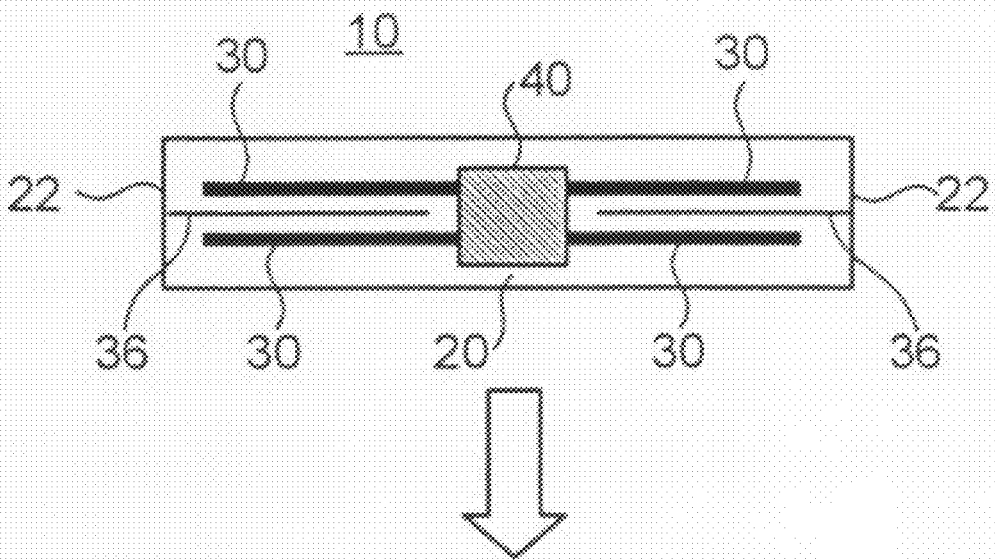
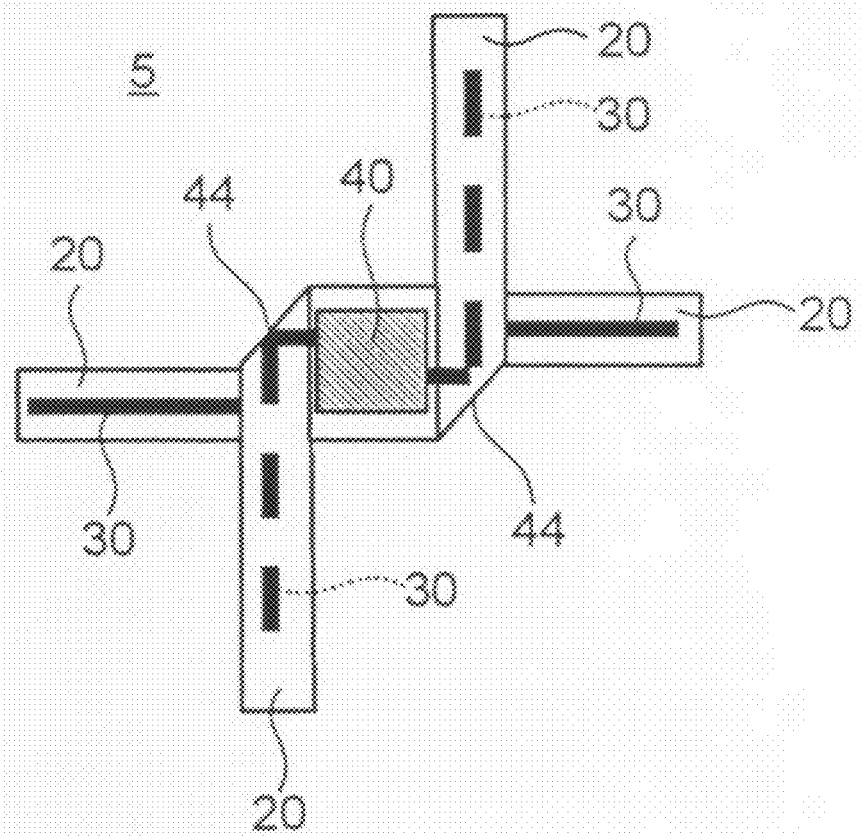

FIG.2
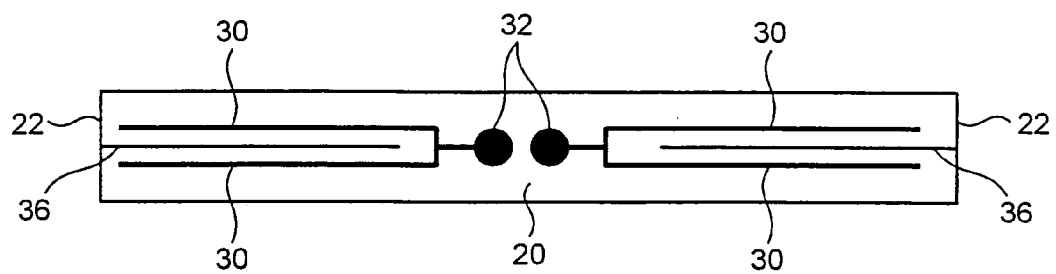
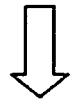
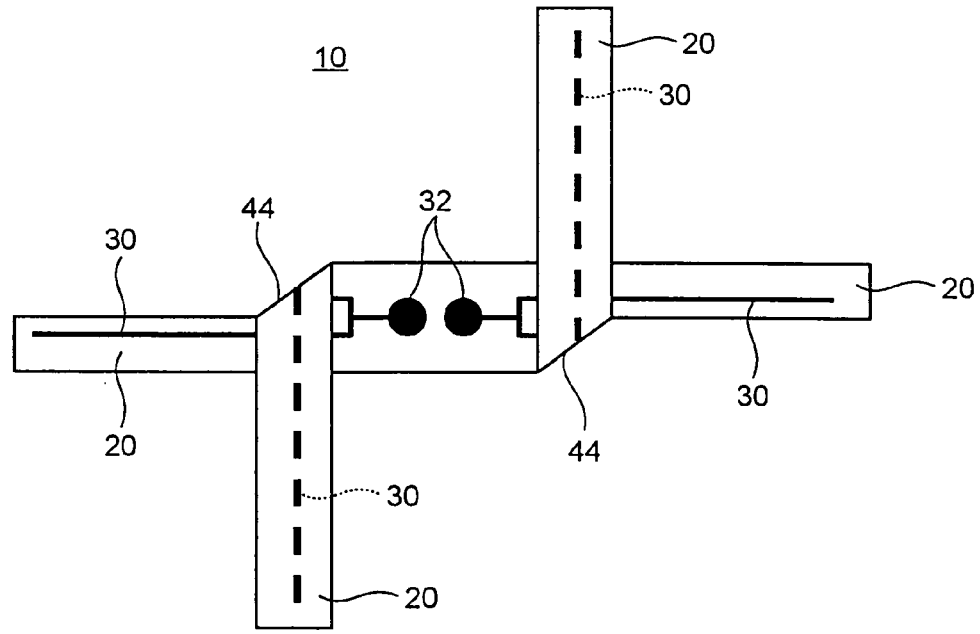

100

100

… …

RFID TAG, RFID-TAG ANTENNA, RFID-TAG ANTENNA SHEET, AND METHOD OF MANUFACTURING RFID TAG

RELATED APPLICATION

This application is a continuation of U.S. patent application Ser. No. 10/998,138 filed Nov. 29, 2004 which application claims priority under 35 U.S.C. 119 of Japanese Application No. 2004-253458, filed Aug. 31, 2004, the entire contents of which are incorporated herein by reference.

BACKGROUND OF THE INVENTION

1. Field of the Invention

The present invention relates to a radio frequency identification (RFID) tag, an RFID-tag antenna, an RFID tag antenna sheet for a non-contact IC card that receives power and information from an external device and transmits information to the external device, and a method of manufacturing the RFID tag.

2. Description of the Related Art

Recently, an RFID tag (also referred to as an RFID-tag inlay, a radio IC tag, a non-contact IC tag, etc) for a non-contact integrated-circuit (IC) card that receives power and information from an external device such as a reader/writer and transmits information to the external device, without making a contact using a radio wave became popular. FIG. 18 is a plan view of a conventional RFID tag. As shown in FIG. 18, for example, an RFID tag 100 includes an antenna pattern 102 and an IC chip 103 that are provided on a film base 101 formed with a material such as plastics. The antenna pattern 102 and a capacity element embedded in the IC chip 103 form a resonant circuit. The RFID tag 100 communicates with an external device by radio through the antenna pattern 102.

The antenna pattern 102 is formed by printing a conductive ink onto the film base 101, or is formed by etching a conductor, such as a metal conductor like copper. A surface of the antenna pattern 102 and a surface of the IC chip 103 are covered with a protection film when necessary.

To improve a performance of a plane antenna of the RFID tag 100, a number of the antenna patterns 102 can be increased. FIG. 19 is a plan view of a conventional RFID tag that has a cross antenna pattern. As shown in FIG. 19, for example, the antenna pattern 102 can be formed in a cross shape. FIG. 20 is a plan view of a conventional RFID tag that has a radial antenna pattern. As shown in FIG. 20, the antenna pattern 102 can also be formed in a radial shape. The antenna pattern 102 can also be formed in a complex shape like a spiral to provide an increased area for receiving signals.

FIGS. 21 and 22 are plan views of a sheet on which a plurality of conventional RFID tags are formed. A plurality of RFID tags 100, each having the above antenna patterns 102, are formed at a same time on a same sheet 104 as shown in FIGS. 21 and 22. By cutting the sheet 104 along vertical and lateral cut lines 105, mass production of the RFID tags 100 can be achieved.

As shown in FIG. 22, each RFID tag 100 formed with the cross antenna pattern 102 occupies a large area on the sheet 104 due to a shape of the antenna pattern 102. Therefore, a production yield of the RFID tag 100 per one piece of the sheet 104 is low when cut along the cut lines 105, and as a result, manufacturing cost of the RFID tag 100 increases. This similarly applies to the RFID tag 100 that has the radial antenna pattern 102 shown in FIG. 20.

FIG. 23 is a plan view of an RFID tag antenna according to another conventional technology, and FIG. 24 is a plan view of RFID tag antennas for explaining the production yield. As shown in FIGS. 23 and 24, an RFID tag (non-contact IC card) antenna with an improved production yield of the antenna (the film base) is proposed. Such technology is disclosed in, for example, Japanese Patent Application Laid-Open No. 2001-94322.

As shown in FIG. 23, an antenna coil 180 for the RFID tag is formed as follows. A band film 110 formed in substantially a U-shape has opening ends 110a spreading toward a bottom. A conductor 120 is formed on a surface of the band film 110 spirally along a shape of the band film 110. A cut line 112 is formed at substantially a center of the band film 110 inside the conductor 120.

A band film part 114 formed inside the cut line 112 is folded at both ends of the cut line 112. The band film part 114 is folded toward a side of the open end 110a relative to a band film part 116 that is formed at a portion outside the cut line 112.

A loop band frame 150 is formed as a result. The conductor 120 is wound substantially spirally on a surface of the band film part 116a and a surface of a band film part 114 that is a surface facing an opposite side from the surface of the band film part 116, thereby forming an antenna coil 180.

Such band film 110 can improve the production yield by arranging more than one of the band film 110 on an insulation film 200 as shown in FIG. 24. In other words, a density of the band film 110 formed on the film 200 is increased by arranging in such a manner that a closed end 110b of the band film 110 is inserted without a gap from an opening end 110a of an adjacent piece of the band film 110, effectively using a portion inside the substantially U-shape of the band film 110 adjacent. With this arrangement, the formation density of the band film 110 on the film 200 is increased.

As explained with reference to FIGS. 21 and 22, when forming plane antennas, a high production yield of the RFID tag 100 cannot be obtained from the sheet 104 by simply increasing the number of antenna patterns 102. In addition, the plane antenna has a limit in improvement of reception sensitivity of a polarized wave and in directivity. Moreover, a communication distance cannot be increased.

Therefore, there is a demand for an RFID tag antenna that has an increased number of antenna patterns arranged three-dimensionally to solve the above problems. For example, it is considered possible to form a three-dimensional antenna by joining an antenna wiring perpendicularly to a surface of an antenna pattern, thereby enlarging a range of receiving a polarized wave and improving performance the antenna.

However, in many cases, a flexible film made of polyethylene telephthalate (PET) or polyimide (PI) is used for the film base of an RFID tag. Therefore, when this material is used to form a three-dimensional antenna, an increased length of the antenna increases a weight of the film base. As a result, the film base can hardly maintain a shape without flexure. When the film base becomes flexuous during use of the RFID tag, the antenna wiring also becomes flexuous, which changes a shape of the antenna. Consequently, the performance the antenna is degraded.

To avoid the flexure of the antenna wiring vertically erected, a separate reinforcing member can be provided at a root of the antenna wiring. Although stiffness of the antenna increases because of the reinforcement, manufacturing cost increases by an increase process. The provision of the reinforcing member increases mass, which may constrain an article to which the RFID tag can be applied.

According to the above conventional technique of the Japanese Patent Application Laid-Open No. 2001-94322, the formation of the antenna coil 180 can increase the production yield of the band film 110 from the film 200 as shown in FIG. 24. However, since the antenna is a plane coil antenna, there is a limit to the improvement in the reception sensitivity of a polarized wave or the improvement in directivity. Further, a communication distance cannot be increased.

Therefore, there is a demand for an RFID tag and a method of manufacturing an RFID tag that can secure a sufficiently high production yield from the material and that can improve the antenna performance. There is also a demand for an RFID tag antenna to be used for the RFID tag, and an RFID-tag antenna sheet as an aggregate of the RFID tag antennas.

SUMMARY OF THE INVENTION

It is an object of the present invention to solve at least the above problems in the conventional technology.

A radio-frequency-identification tag antenna according to one aspect of the present invention includes a film base; a plurality of antenna patterns for transmission and reception, the antenna patterns being formed in parallel on the film base; and a cut line that is formed on the film base between adjacent antenna patterns along the antenna patterns from an inside to an outer edge of the film base. A part of the film base on which the antenna patterns are formed is folded or bent in a predetermined direction using the cut line.

A radio-frequency-identification tag according to another aspect of the present invention includes a film base; a plurality of antenna patterns for transmission and reception, the antenna patterns being formed in parallel on the film base; a cut line that is formed on the film base between adjacent antenna patterns along the antenna patterns from an inside to an outer edge of the film base; and an integrated-circuit chip that incorporates a communication circuit and a memory circuit, the integrated-circuit chip being electrically connected to the antenna patterns. A part of the film base on which the antenna patterns are formed is folded or bent in a predetermined direction using the cut line.

An radio-frequency-identification tag antenna sheet according to still another aspect of the present invention is formed as a group of the radio-frequency-identification tag antennas, on which a plurality of a radio-frequency-identification tag antennas is disposed on a same plane. The radio-frequency-identification tag antenna includes a film base; a plurality of antenna patterns for transmission and reception, the antenna patterns being formed in parallel on the film base; and a cut line that is formed on the film base between adjacent antenna patterns along the antenna patterns from an inside to an outer edge of the film base. A part of the film base on which the antenna patterns are formed is folded or bent in a predetermined direction using the cut line.

A method of manufacturing a radio-frequency-identification tag according to still another aspect of the present invention includes forming a plurality of antenna patterns for transmission and reception in parallel on a film base; connecting electrically an integrated-circuit chip that incorporates a communication circuit and a memory circuit, onto each of the antenna patterns; forming a cut line on the film base between adjacent antenna patterns along the antenna patterns from an inside to an outer edge of the film base; and forming a desired shape of an antenna by folding or bending the film base formed with the antenna patterns in a predetermined direction by using the cut line.

The other objects, features, and advantages of the present invention are specifically set forth in or will become apparent from the following detailed description of the invention when read in conjunction with the accompanying drawings.

BRIEF DESCRIPTION OF THE DRAWINGS

FIG. 1 is a plan view of an RFID tag according to a first embodiment of the present invention, illustrating a process of forming the RFID tag;

FIG. 2 is a plan view of an RFID tag antenna, illustrating a process of folding the antenna;

DETAILED DESCRIPTION

Exemplary embodiments of an RFID tag, an RFID-tag antenna, an RFID-tag antenna sheet, and a method of manufacturing the RFID TAG according to the present invention will be explained in detail with reference to the accompanying drawings. Note that the present invention is not limited by the embodiments.

Figure 3:
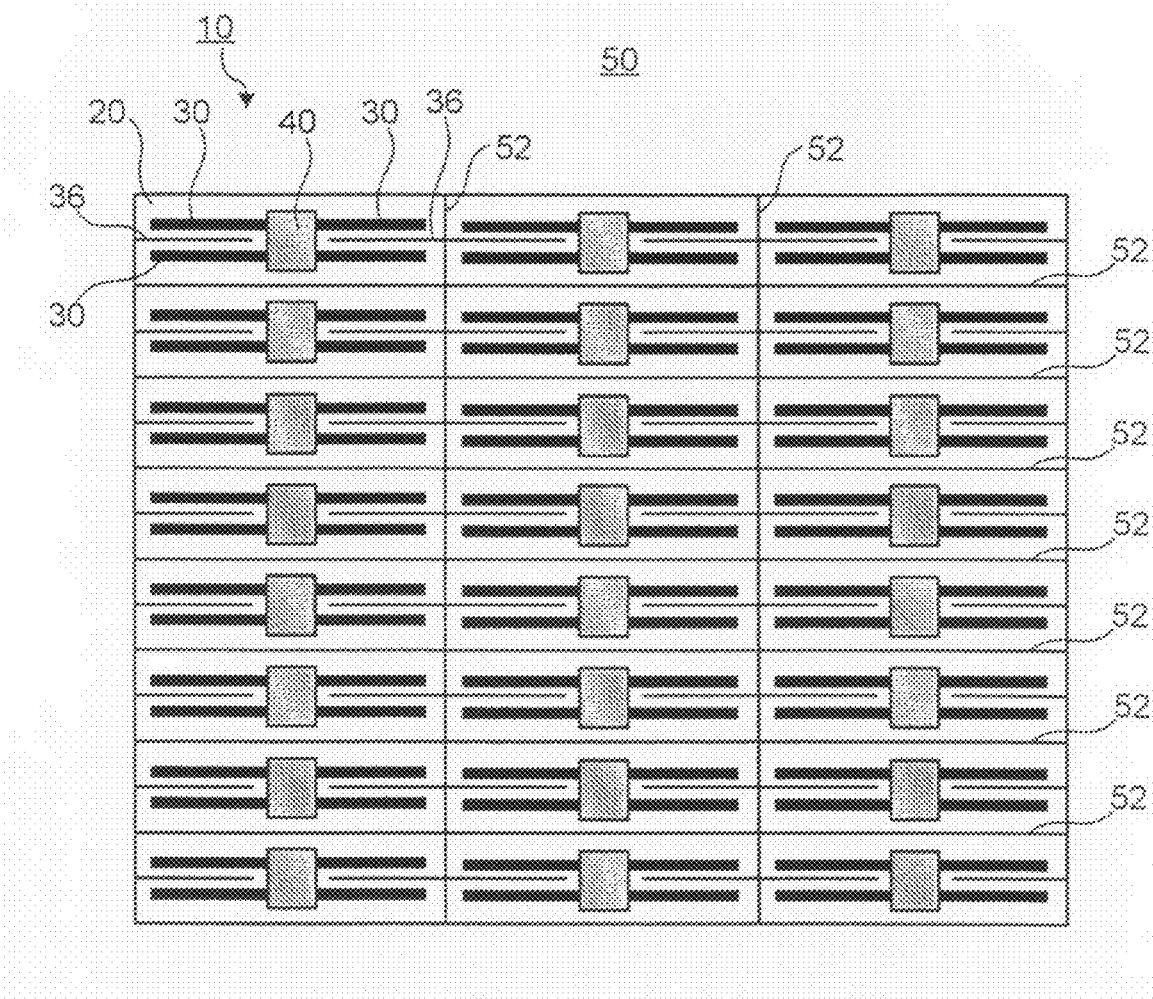
FIG. 3 is a plan view of an RFID-tag antenna sheet.

FIG. 1 is a top plan view of an RFID tag according to a first embodiment of the present invention, illustrating a process of forming the RFID tag. FIG. 2 is a top plan view of an RFID tag antenna, illustrating a process of folding the antenna. FIG. 3 is a top plan view of an RFID-tag antenna sheet.

As shown in FIG. 1, an RFID tag antenna 10 that forms an RFID tag 5 includes a film base 20, transmission/reception antenna patterns 30 that are formed in two rows in parallel on the film base 20, a cut line 36 formed on the film base 20 between the adjacent antenna patterns 30 along the antenna patterns 30 from the inside of the film base 20 to reach an external edge 22, and an IC chip 40 that is electrically connected to the antenna patterns 30.

In the present specification, the film base 20 with the IC chip 40 mounted thereon and that without mounting the IC chip 40 are both called an "RFID tag antenna".

The film base 20 is made of flexible thermoplastics. In other words, PET, polyimide (PI), polyethylene naphthalate (PEN), or polyvinyl chloride (PVC) can be used for the film base 20. Considering processability, insulation, mechanical strength, and price, PET is most suitable for the material of the film base 20. Alternatively, the film base 20 can be formed with paper.

As shown in FIG. 1, the antenna patterns 30 for transmission and reception are formed on the surface of the film base 20 with a printing unit. For example, the antenna patterns 30 can be formed by screen printing a conductive paste onto the film base 20.

Alternatively, the antenna patterns 30 can be formed by etching a conductor (such as a metal conductor like copper). In FIG. 1 and FIG. 2, positions (perspective positions) of the antenna patterns 30 on the back surface of the film base 20 are indicated by broken lines.

As shown in FIG. 2, the film base 20 has a pair of chip mounting pads 32 that electrically connect the IC chips 40 mounted thereon with the antenna patterns 30. The chip mounting pads 32 can be formed simultaneously with the antenna patters 30, by screen printing a conductive paste onto the film base 20. The chip mounting pads 32 can be provided corresponding to the positions and the number of chip electrodes of the IC chips 40 described later.

Each IC chip 40 has a communication circuit, a memory, and a predetermined control circuit to record and read information without contact, and has a chip electrode (not shown) to electrically connect to the chip mounting pad 32 provided in an extending manner on the antenna pattern 30.

The control circuit is not necessarily provided within the IC chip 40. The IC chip 40 can be mounted onto the chip mounting pad 32 according to various methods publicly known, such as what is called a flip-chip mounting method.

After the film base 20 is formed with the antenna patterns 30 or is mounted with the IC chip 40 formed with the antenna patterns 30, an insulating cover sheet (an insulating material), not shown, is coated onto the film base 20, thereby protecting the film base 20 from the external environment such as external force and moisture.

This cover sheet is made of the same kind of thermoplastics as that used for the film base 20. Therefore, when the film base 20 and the cover sheet are pressed together at a certain pressure with a roller, not shown, while being heated to a certain temperature, the cover sheet can be fused onto the film base 20 to easily cover the film base 20.

The cut line 36 is formed on the film base 20 to obtain a desired shape of an antenna by folding the film base 20 at a bending section 44 as shown in FIG. 1. Therefore, a cut line depth and a cut angle (parallelism relative to the antenna pattern 30) are set according to a folding state of the film base 20. A bending direction of the film base 20 is also set according to a desired shape of the antenna.

As shown in FIG. 1, a pair of film bases 20 on the RFID tag antenna 10 is folded back at the bending sections 44 to obtain the RFID tag 5 having substantially a cross shape in the antenna in total. The film base 20 is folded by heating and pressing the film base 20.

Since the film base 20 is formed using a thermoplastic material, the film base 20 can be easily folded and fused. After cooling and curing the heated film base 20, the folded shape can be maintained. An adhesive or a two-sided tape can be used to fix the folded part of the film base 20.

The RFID tag antenna 10 shown in FIG. 1 can be obtained by cutting out a large number of the RFID tag antennas 10 arranged in a longitudinal direction and in a width direction, from the RFID-tag antenna sheet 50, in a lattice shape along cut lines 52 as shown in FIG. 3.

By folding the cut out RFID tag antenna 10, the RFID tag 5 that has substantially the cross-shaped plane antenna can be obtained as shown in FIG. 1. When the RFID-tag antenna sheet 50 is formed in the manner as described above, a large number of RFID tag antennas 10 can be cut out efficiently and promptly.

A method of manufacturing the RFID tag 5 is explained next. The method of manufacturing the RFID tag 5 includes an antenna pattern forming step of printing and forming a plurality of transmission/reception antenna patterns 30 in parallel on the film base 20, an IC chip mounting step of electrically connecting the IC chip 40 onto each antenna pattern 30, a laminating step of covering the IC chip 40 and the antenna pattern 30 with the cover sheet, a cut line forming step of forming the cut line 36 on the film base 20 between the adjacent antenna patterns 30 along the antenna patterns 30 from the inside of the film base 20 to reach the external edge 22, and an antenna shape forming step of forming a desired shape of an antenna by folding or bending in a predetermined direction a part of the film base 20 formed with the antenna patterns 30, by using the cut line 36.

The antenna pattern forming step, the IC chip mounting step, and the laminating step are carried out at the time of forming the RFID-tag antenna sheet 50. The cut line forming step is carried out at the same time when the individual RFID tag antennas 10 are cut out from the RFID-tag antenna sheet 50. The laminating step can be carried out when necessary, and can be omitted.

Figure 22:
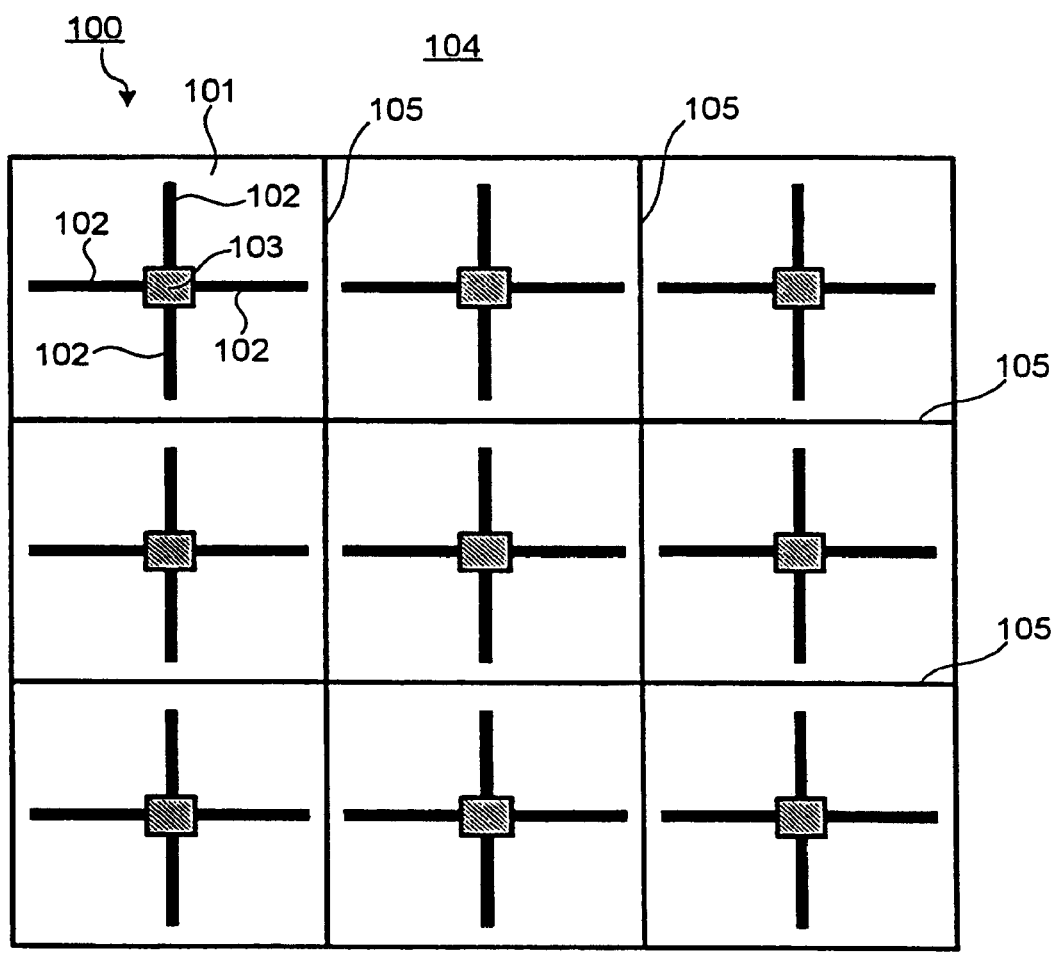
FIG. 22 is a plan view of the sheet on which a plurality of conventional RFID tags is formed.
Figure 23:
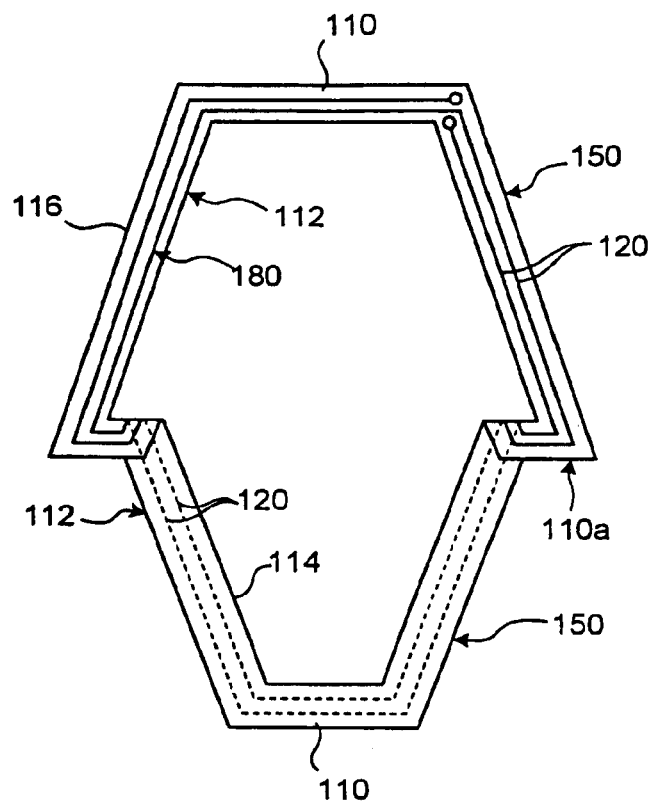
FIG. 23 is a plan view of an RFID tag antenna according to another conventional technology.
Figure 24:
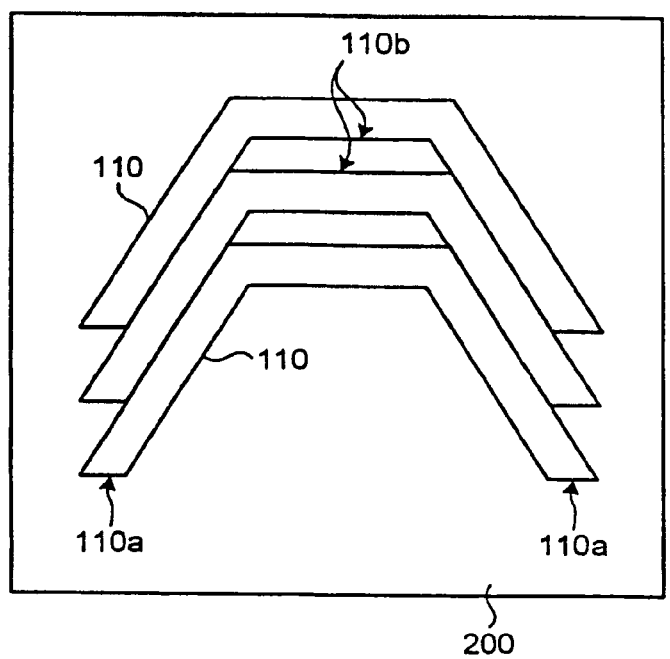
FIG. 24 is a plan view of RFID tag antennas for explaining a production yield from a material.

As explained above, according to the first embodiment, the RFID tag 5 can be obtained by forming the RFID tag antenna 10 in a cross shape after the RFID tag antenna 10 is cut out from the RFID-tag antenna sheet 50, unlike the conventional method of using a sheet 104 having a cross antenna shape in advance (refer to FIG. 22). Accordingly, the RFID tag antenna 10 as a dipole antenna can be formed in high density on the RFID-tag antenna sheet 50 before cutting the RFID-tag antenna sheet 50 (refer to FIG. 3).

Therefore, according to the first embodiment, the RFID tag 5, the RFID tag antenna 10, and the RFID-tag antenna sheet 50 can secure a sufficiently high production yield from the material. Since the RFID tag 5 has a cross-shaped plane antenna, the signal reception area of the antenna can be increased to some extent, and the antenna performance can be improved.

The film base 20 can be folded at an arbitrary angle at the folding section 44, and the folding angle is not limited to those shown in FIG. 1 and FIG. 2. Instead of folding the film base 20 at the folding section 44, the film base 20 can be bent at a certain curvature.

Figure 4:
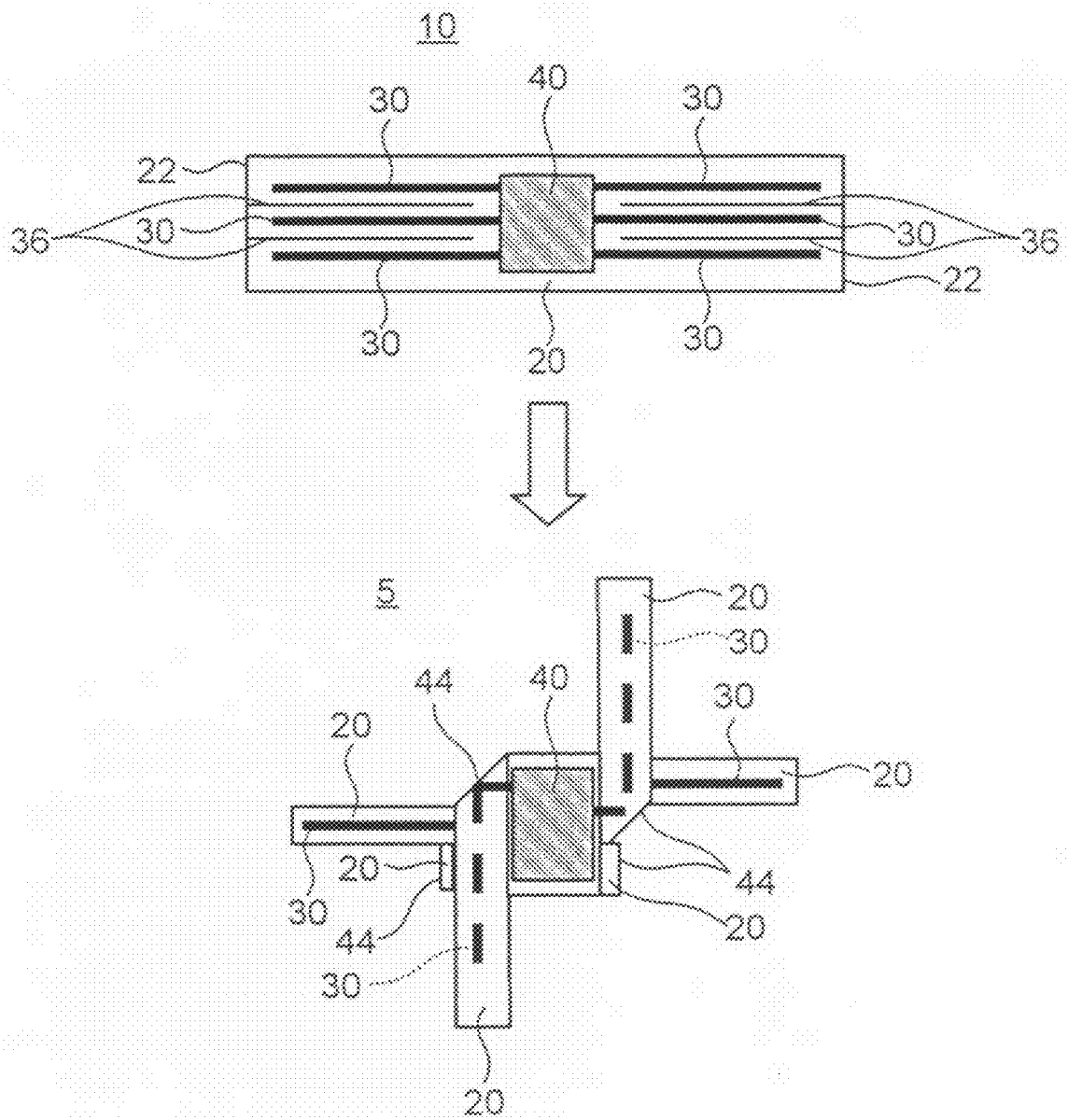
FIG. 4 is a plan view of an RFID tag according to a second embodiment of the present invention, illustrating a process of forming the RFID tag.
Figure 5:
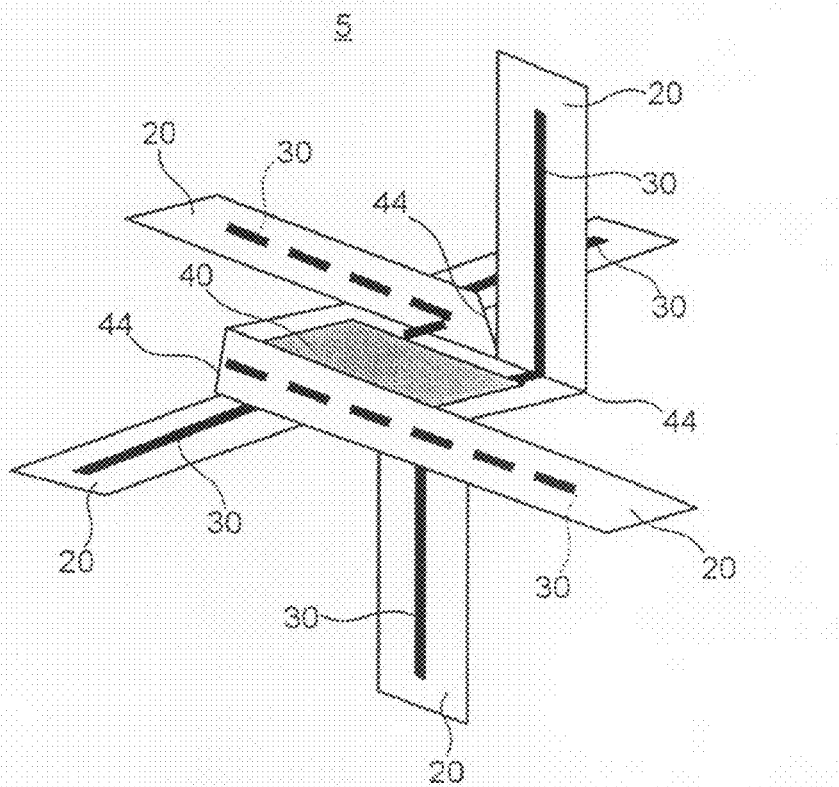
FIG. 5 is a perspective view of the RFID tag.
Figure 6:
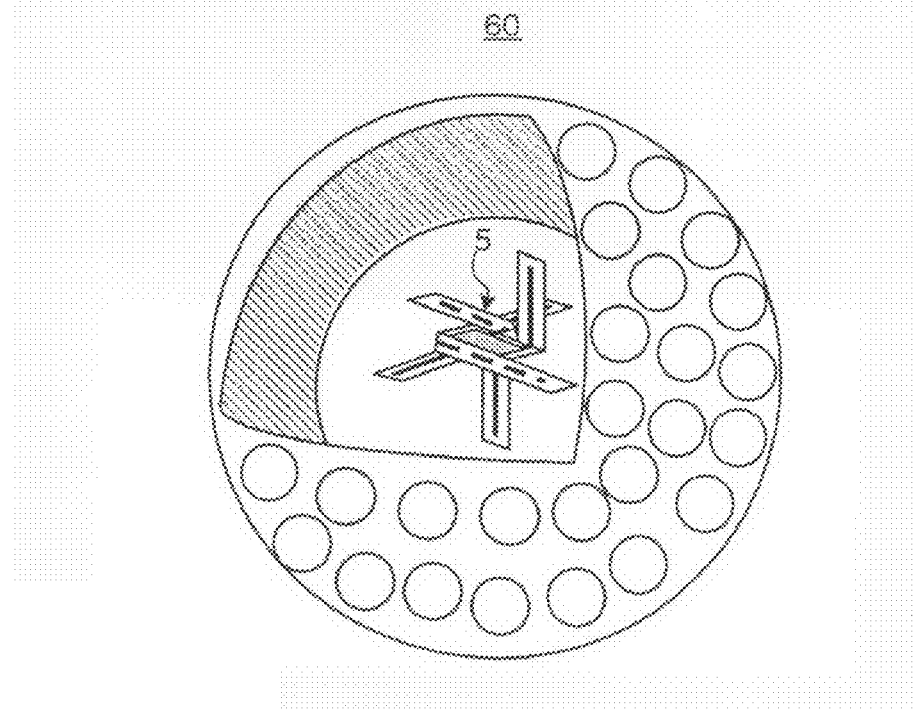
FIG. 6 is a perspective view of an example of an RFID tag that is embedded in a golf ball.

FIG. 4 is a top plan view of an RFID tag according to a second embodiment of the present invention, illustrating a process of forming the RFID tag. FIG. 5 is a perspective view of the RFID tag. FIG. 6 is a perspective view of an RFID tag that is incorporated in a golf ball. In the explanation below, like reference numerals designate like or similar parts as those already explained and a redundant explanation is omitted.

An RFID tag antenna 10 according to the second embodiment is different from that according to the first embodiment in the following points. As shown in FIG. 4 and FIG. 5, the RFID tag antenna 10 includes the transmission/reception antenna patterns 30 that are formed in three parallel rows on the film base 20, and the cut lines 36 that are formed on the film base 20 between the adjacent antenna patterns 30 along the antenna patterns 30 from the inside of the film base 20 to reach the external edge 22. The three-row antenna patterns 30 formed on the film base 20 are folded in a perpendicular direction at the folding section 44, thereby forming a three-dimensional antenna. Other configurations and a manufacturing method are substantially the same as those according to the first embodiment, and therefore, a redundant explanation is omitted.

As explained above, according to the second embodiment, the RFID tag antenna 10 and the RFID tag 5 using this RFID tag antenna 10 can secure a sufficiently high production yield from the material, and three-dimensional antennas can be obtained in the same manner as that according to the first embodiment. Therefore, the reception sensitivity of a polarized wave and directivity can be improved. Consequently, a communication distance can be increased.

When the RFID tag 5 according to the second embodiment is incorporated into a golf ball 60 that requires a communication distance as shown in FIG. 6, high antenna performance can be obtained. The RFID tag 5 is fixed with an insulating material at the surrounding.

While a part of the film base 20 is folded in a perpendicular direction at the folding section 44 according to the second embodiment, the folding angle is not limited to this.

Figure 7:
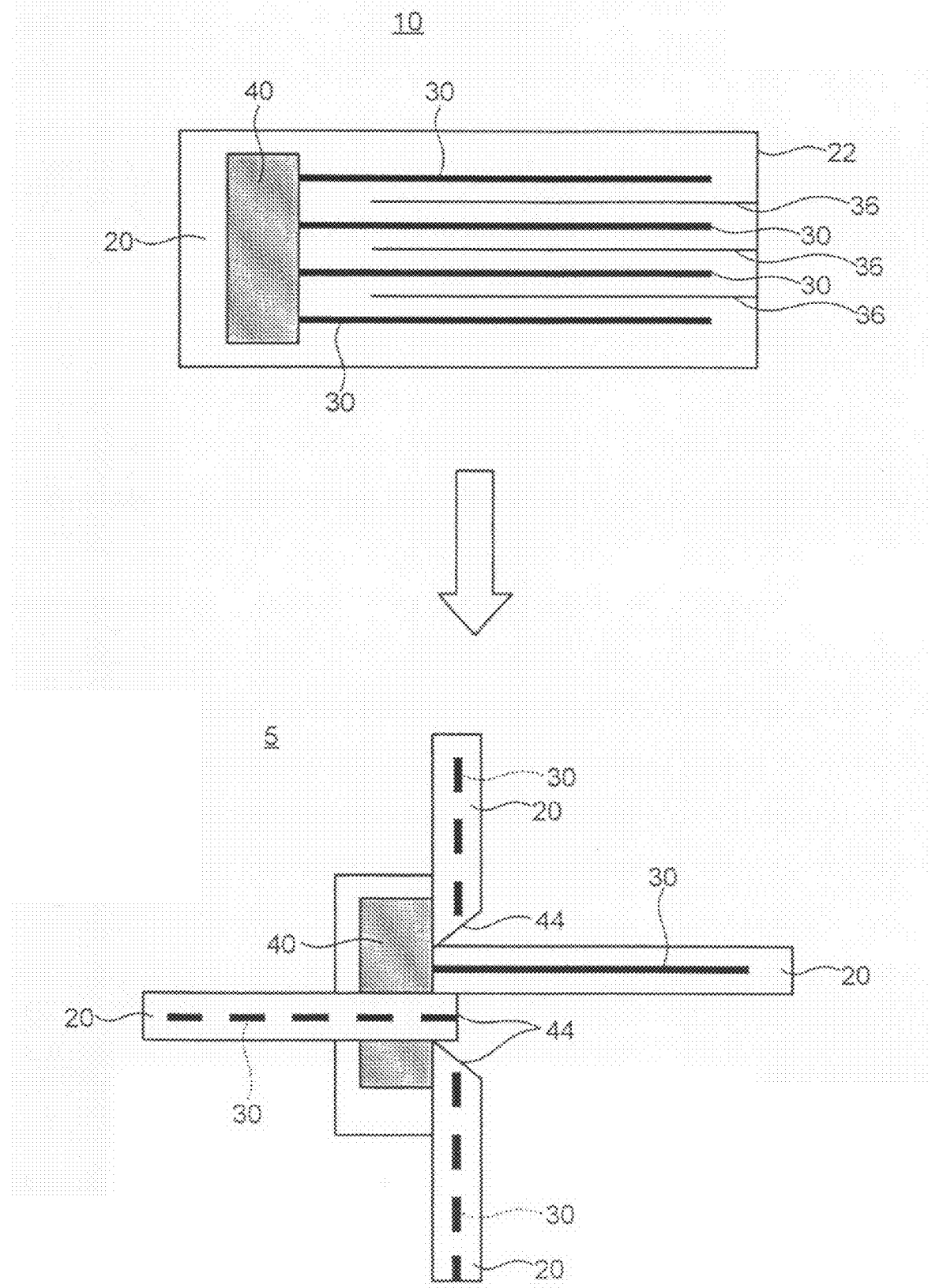
FIG. 7 is a plan view of an RFID tag according to a third embodiment of the present invention, illustrating a process of forming the RFID tag.

FIG. 7 is a top plan view of an RFID tag according to a third embodiment of the present invention, illustrating a process of forming the RFID tag. As shown in FIG. 7, according to the third embodiment, the antenna patterns 30 are formed in four parallel rows on the film base 20 such that the antenna patterns 30 are positioned at one side of the IC chip 40. The cut lines 36 are formed on the film base 20 between the adjacent antenna patterns 30 along the antenna patterns 30 from the inside of the film base 20 to reach the external edge 22.

Among the four parts of the film base 20 obtained by cutting along the cut lines 36, three parts are folded at the folding section 44 to form a cross-shaped plane antenna in total. Other configurations and a manufacturing method are substantially the same as those according to the first embodiment, and therefore, a redundant explanation is omitted.

As explained above, according to the third embodiment, the RFID tag antenna 10 and the RFID tag 5 using this RFID tag antenna 10 can secure a sufficiently high production yield from the material in the same manner as that according to the first embodiment. At the same time, a signal reception area of the antenna can be increased to some extent, which improves the antenna performance.

Figure 8:
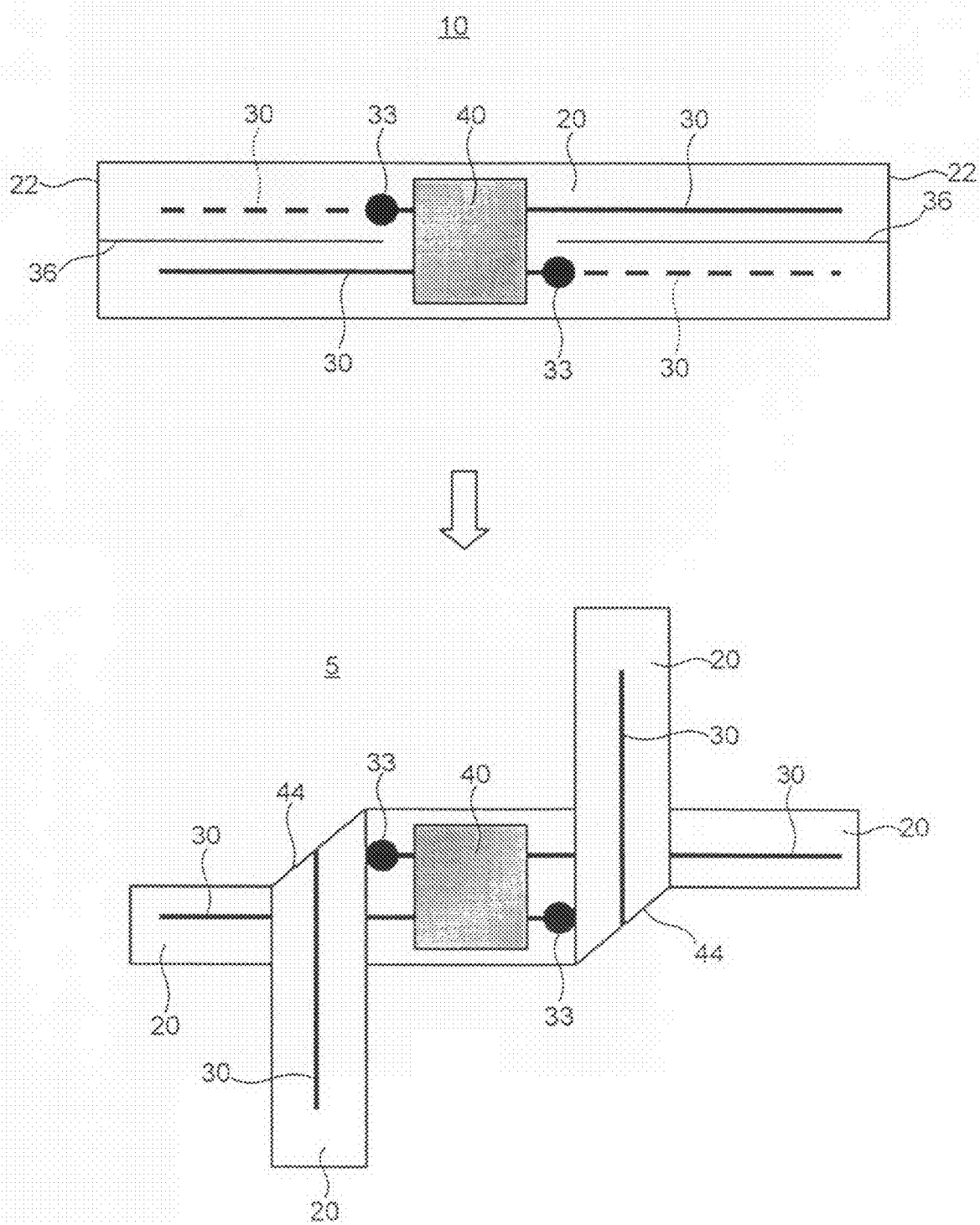
FIG. 8 is a plan view of an RFID tag according to a fourth embodiment of the present invention, illustrating a process of forming the RFID tag.

FIG. 8 is a top plan view of an RFID tag according to a fourth embodiment of the present invention, illustrating a process of forming the RFID tag. The configuration of the RFID tag according to the fourth embodiment is different from that according to the first embodiment in the following points. As shown in FIG. 8, the RFID tag antenna 10 according to the fourth embodiment has the antenna patterns 30 formed on both front and back surfaces of the film base 20. Further, the film base 20 is formed with through-holes 33 (conductive through-holes) through which the antenna patterns 30 formed on both front and back surfaces of the film base 20 are conductively passed. Positions of the antenna patterns 30 formed on the back surface of the film base 20 are indicated by broken lines.

The through-holes 33 can be formed by providing holes on the film base 20 and plating a conductive material on the holes which are the same methods as those used for a normal printed board. Other configurations and a manufacturing method are substantially the same as those according to the first embodiment, and therefore, a redundant explanation is omitted.

As explained above, according to the fourth embodiment, the RFID tag antenna 10 and the RFID tag 5 using this RFID tag antenna 10 can secure a sufficiently high production yield from the material in the same manner as that according to the first embodiment. At the same time, a signal reception area of the antenna can be increased to some extent, which improves the antenna performance.

Figure 9:
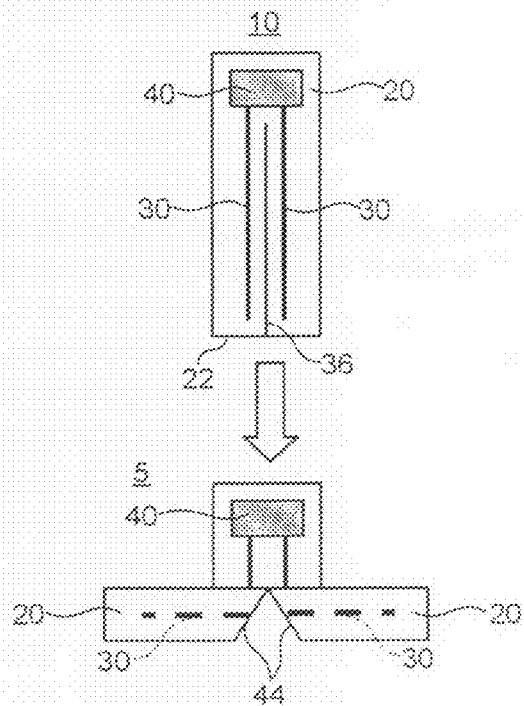
FIG. 9 is a plan view of an RFID tag according to a fifth embodiment of the present invention, illustrating a process of forming the RFID tag.

FIG. 9 is a top plan view of an RFID tag according to a fifth embodiment of the present invention, illustrating a process of forming the RFID tag. As shown in FIG. 9, according to the fifth embodiment, the antenna patterns 30 are formed in two parallel rows on the film base 20 such that the antenna patterns 30 are positioned at one side of the IC chip 40. The cut lines 36 are formed on the film base 20 between the adjacent antenna patterns 30 along the antenna patterns 30 from the inside of the film base 20 to reach the external edge 22.

The two parts of the film base 20 obtained by cutting along the cut lines 36 are folded at the folding section 44 to form two antennas each having an L shape. Other configurations and a manufacturing method are substantially the same as those according to the first embodiment, and therefore, a redundant explanation is omitted.

As explained above, according to the fifth embodiment, the RFID tag antenna 10 and the RFID tag 5 using this RFID tag antenna 10 can secure a sufficiently high production yield from the material in the same manner as that according to the first embodiment. At the same time, two L-shaped antennas are formed. Therefore, a signal reception area of the antenna can be increased to some extent, which improves the antenna performance.

Figure 10:
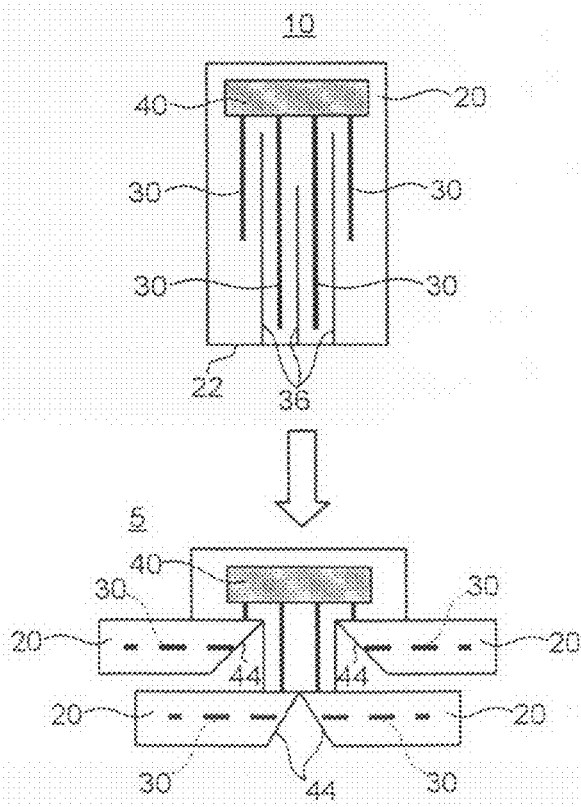
FIG. 10 is a plan view of an RFID tag according to a sixth embodiment of the present invention, illustrating a process of forming the RFID tag.

FIG. 10 is a top plan view of an RFID tag according to a sixth embodiment of the present invention, illustrating a process of forming the RFID tag. As shown in FIG. 10, according to the sixth embodiment, the antenna patterns 30 are formed in four parallel rows on the film base 20 such that the antenna patterns 30 are positioned at one side of the IC chip 40. The cut lines 36 are formed on the film base 20 between the adjacent antenna patterns 30 along the antenna patterns 30 from the inside of the film base 20 to reach the external edge 22.

The four parts of the film base 20 obtained by cutting along the cut lines 36 are folded at the folding section 44 to form four antennas each having an L shape. Other configurations and a manufacturing method are substantially the same as those according to the first embodiment, and therefore, a redundant explanation is omitted.

As explained above, according to the sixth embodiment, the RFID tag antenna 10 and the RFID tag 5 using this RFID tag antenna can secure a sufficiently high production yield from the material in the same manner as that according to the first embodiment. Since the four L-shaped antennas are formed, a signal reception area of the antenna can be increased more than that according to the fifth embodiment, which improves the antenna performance.

Figure 11:
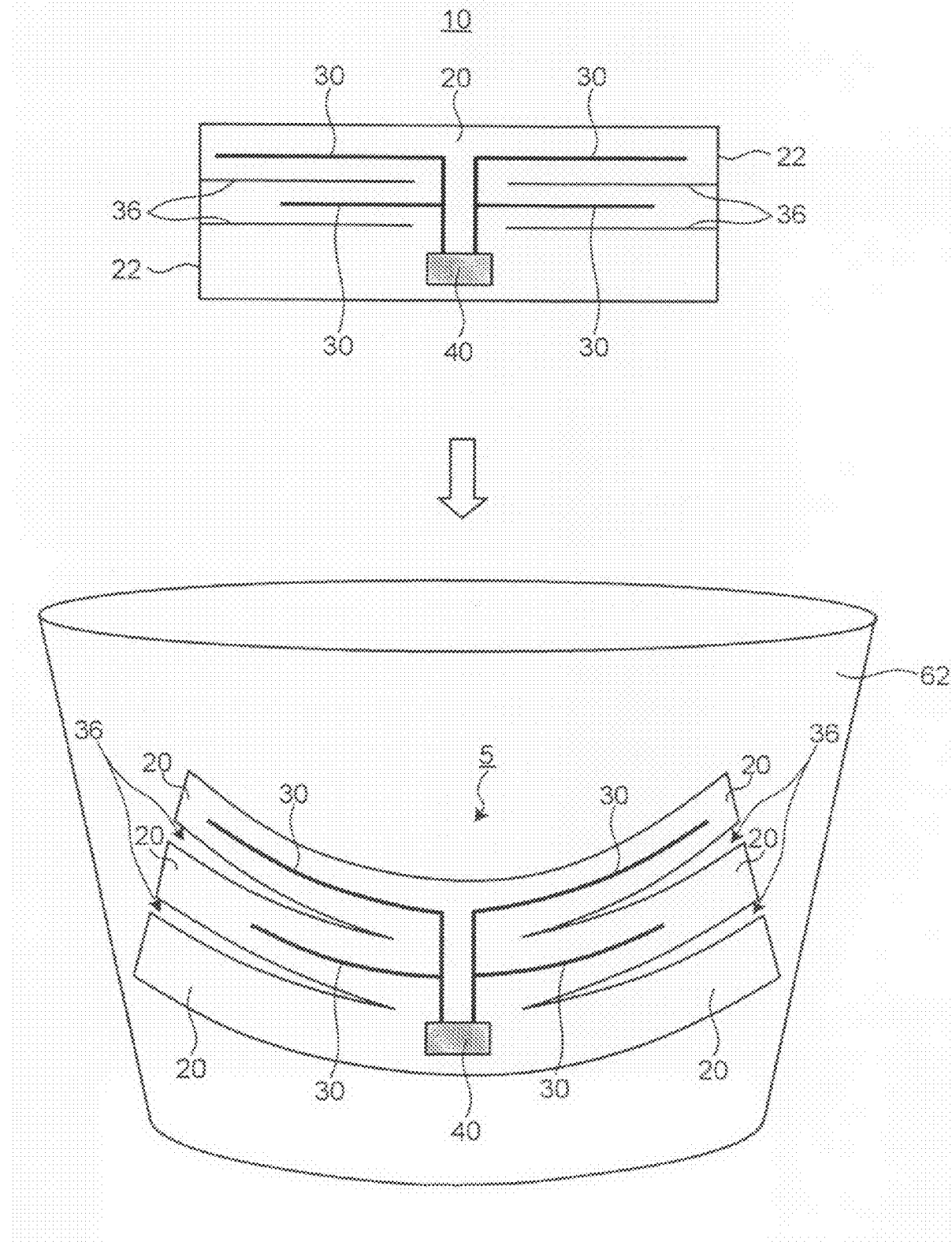
FIG. 11 is an explanatory diagram of an application example of an RFID tag according to a seventh embodiment of the present invention.

FIG. 11 is an explanatory diagram of an application example of an RFID tag according to a seventh embodiment of the present invention. As shown in FIG. 11, according to the seventh embodiment, the antenna pattern 30 is formed in an L-shape, and is electrically connected to the IC chip 40.

Long sides of the antenna patterns 30 are formed in two parallel rows on the film base 20. The cut lines 36 are formed on the film base 20 between the adjacent antenna patterns 30 along the antenna patterns 30 from the inside of the film base 20 to reach the external edge 22.

According to the first to the sixth embodiments, the film base 20 is folded at the folding section 44. On the other hand, according to the seventh embodiment, the film base 20 is cut to some extent along the cut lines 36. The cut parts of the film base 20 are spread with a gap and are pasted by bending the material, with high adhesive force, onto the side surface of a conical article 62. An adhesive or a two-sided tape can be used to paste the film base 20 onto the article 62.

As explained above, according to the seventh embodiment, the RFID tag 5 can secure a sufficiently high production yield from the material like that according to the first embodiment. At the same time, the RFID tag 5 can be pasted with high adhesive force onto the article 62 having a curved surface. Therefore, the RFID tag 5 is not easily peeled off from the article 62, and each antenna pattern 30 can maintain the position. Consequently, stable performance of transmission and reception can be secured.

Figure 12:
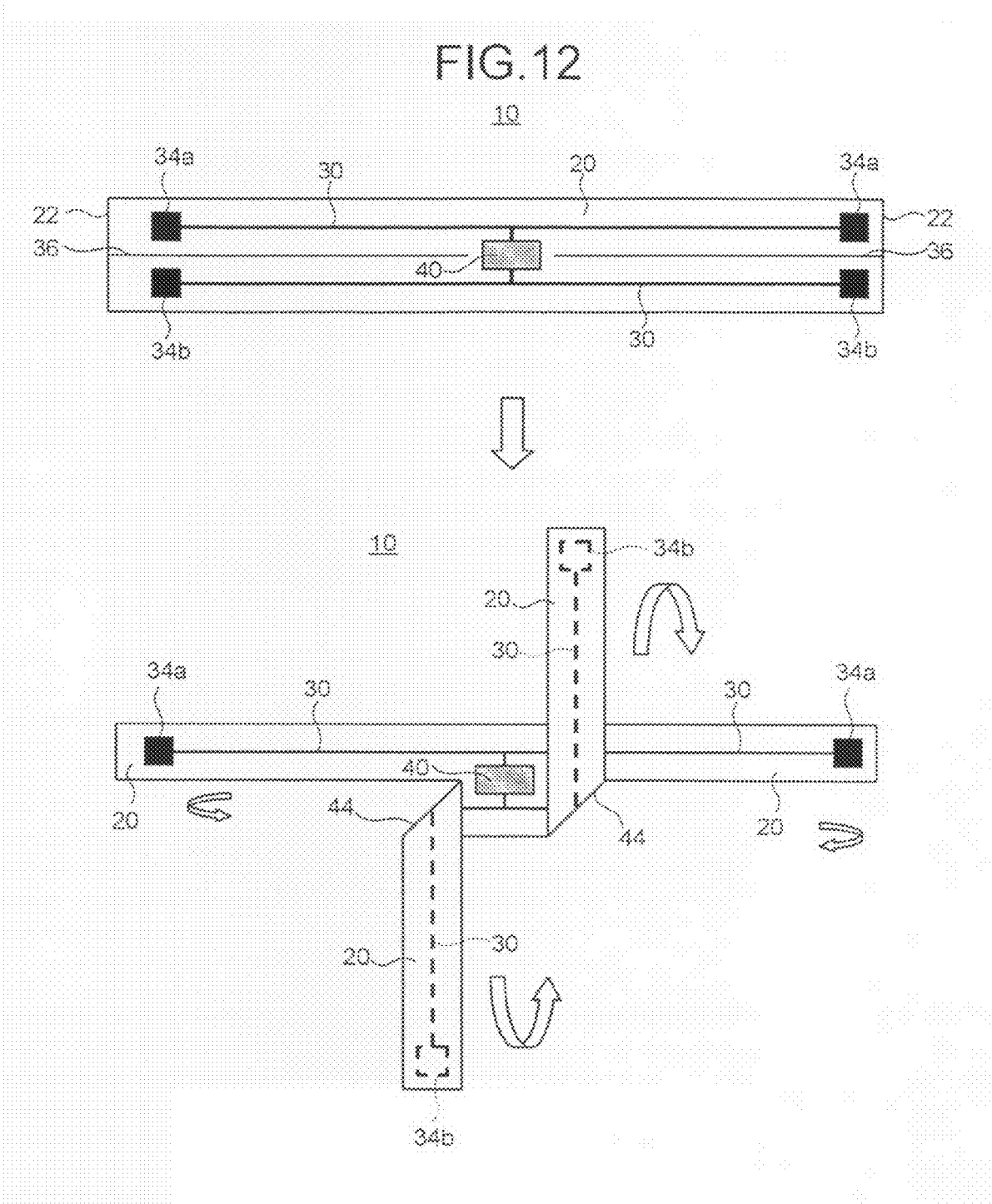
FIG. 12 is a plan view of an RFID tag antenna according to an eighth embodiment of the present invention, illustrating a process of folding the antenna.
Figure 13:
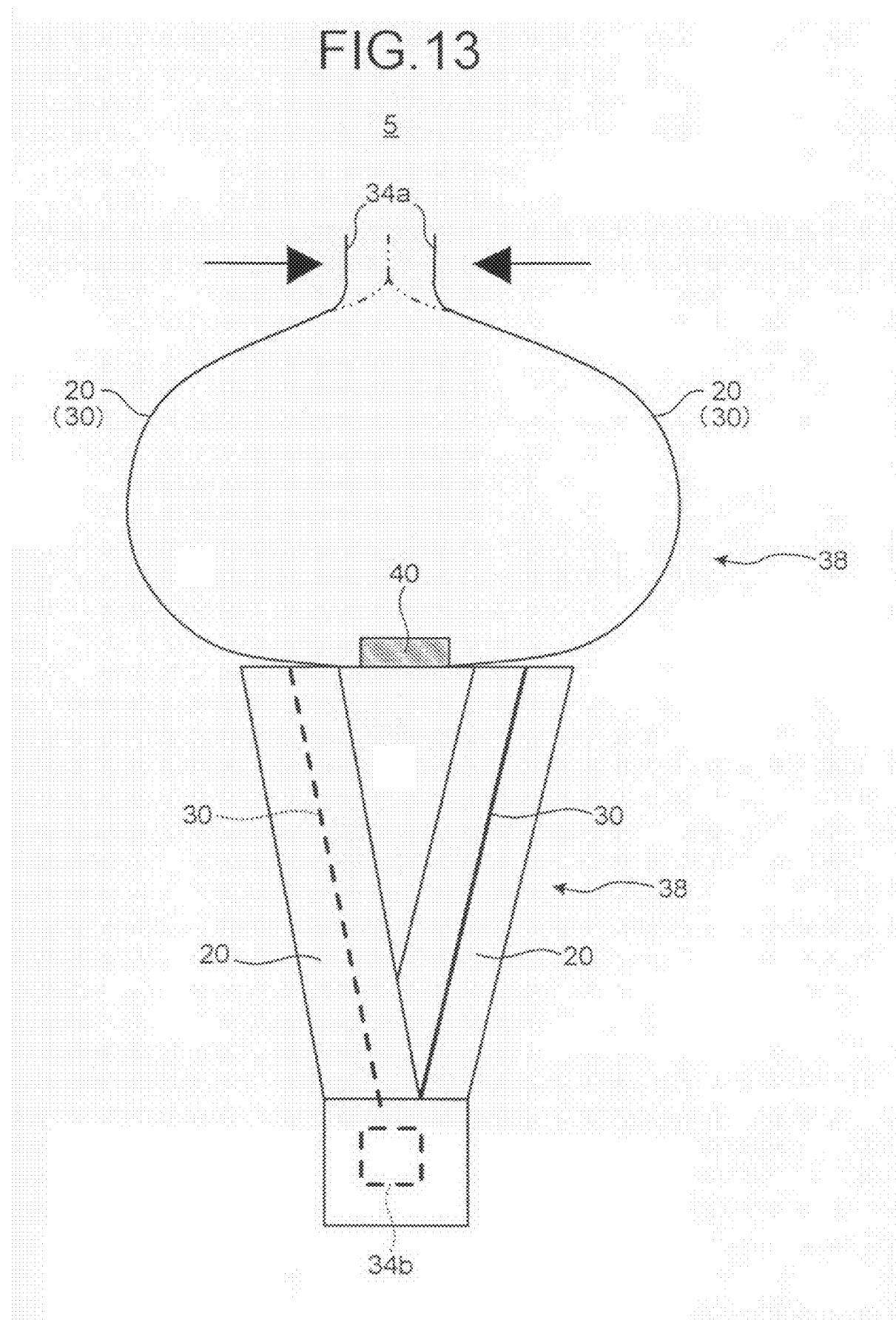
FIG. 13 is a side view of the RFID tag.

FIG. 12 is a top plan view of an RFID tag antenna according to an eighth embodiment of the present invention, illustrating a process of folding the antenna. FIG. 13 is a side view of the RFID tag. As shown in FIG. 12, the configuration of the RFID tag antenna 10 according to the eighth embodiment is substantially the same as that (refer to FIG. 1) according to the first embodiment.

A main difference is that RFID tag antenna 10 according to the eighth embodiment has adhesive pads 34a and 34b, which are coated with conductive adhesive exhibiting a predetermined adhesive force by pressing and heating, formed at the ends of the antenna patterns 30.

As shown in FIG. 12 and FIG. 13, a set of film bases 20 are folded at the folding sections 44 using the cut lines 36, and at the same time, another set of film bases 20 are also bent. The adhesive pads 34a and 34a are adhered together, and the adhesive pads 34b and 34b are adhered together, on the film bases 20 respectively.

By bonding the ends of the film base 20 together, one loop antenna 38 is formed above the IC chip 40, and another loop antenna 38 is formed below the IC chip 40. In FIG. 13, a state after the adhesion between the adhesive pads 34a and 34a is shown using an imaginary line.

As explained above, according to the eighth embodiment, the RFID tag 5 can secure a sufficiently high production yield from the material like that according to the first embodiment. At the same time, the provision of the two loop antennas 38 can improve the reception sensitivity of a polarized wave, and can increase a communication distance.

Figure 14:
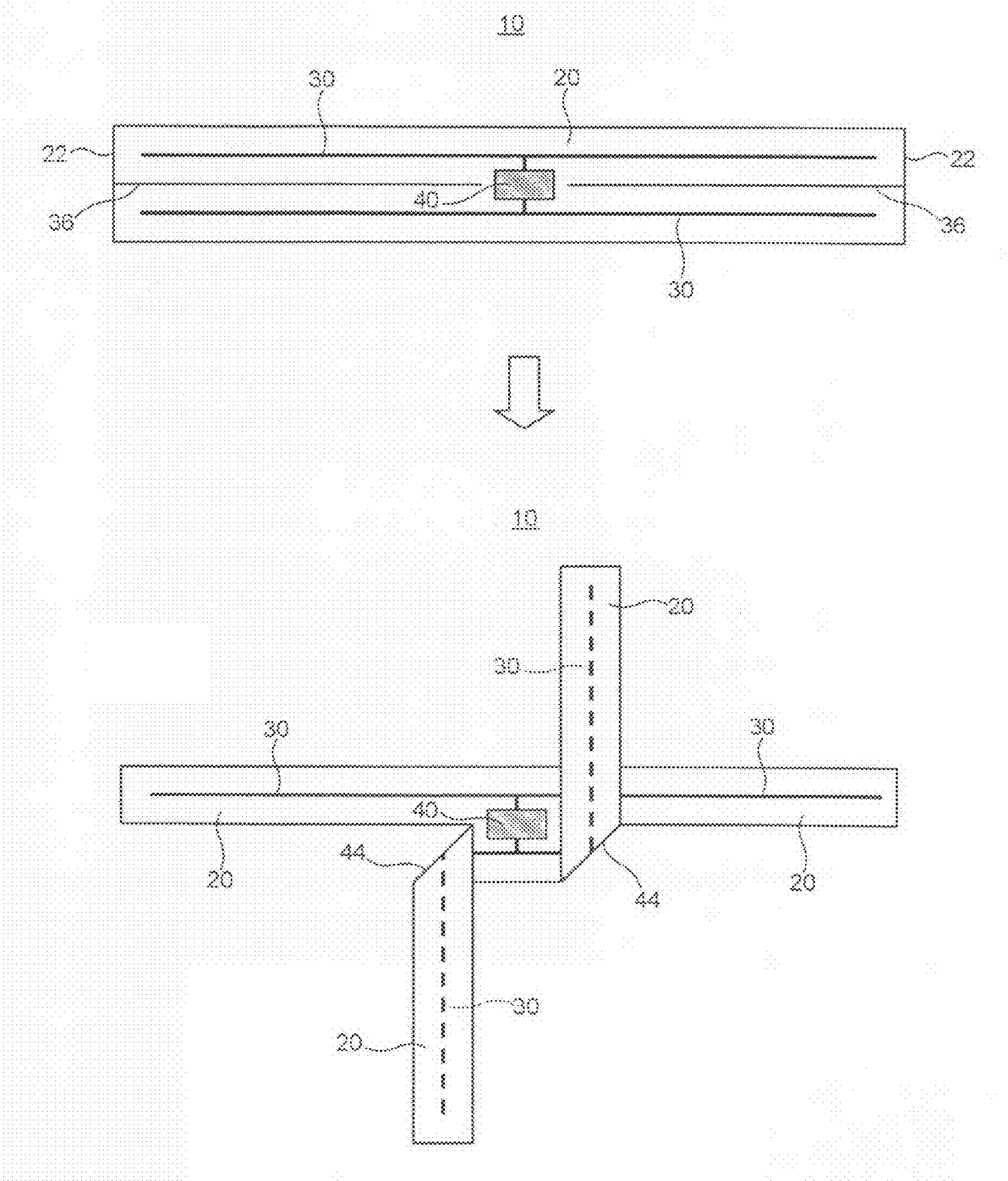
FIG. 14 is a plan view of an RFID tag antenna according to a ninth embodiment of the present invention, illustrating a process of folding the antenna.
Figure 15:
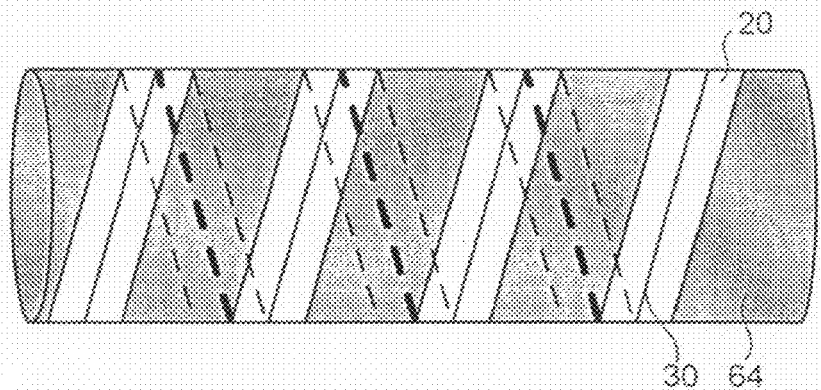
FIG. 15 is an explanatory diagram of a process of forming a helical antenna.
Figure 16:
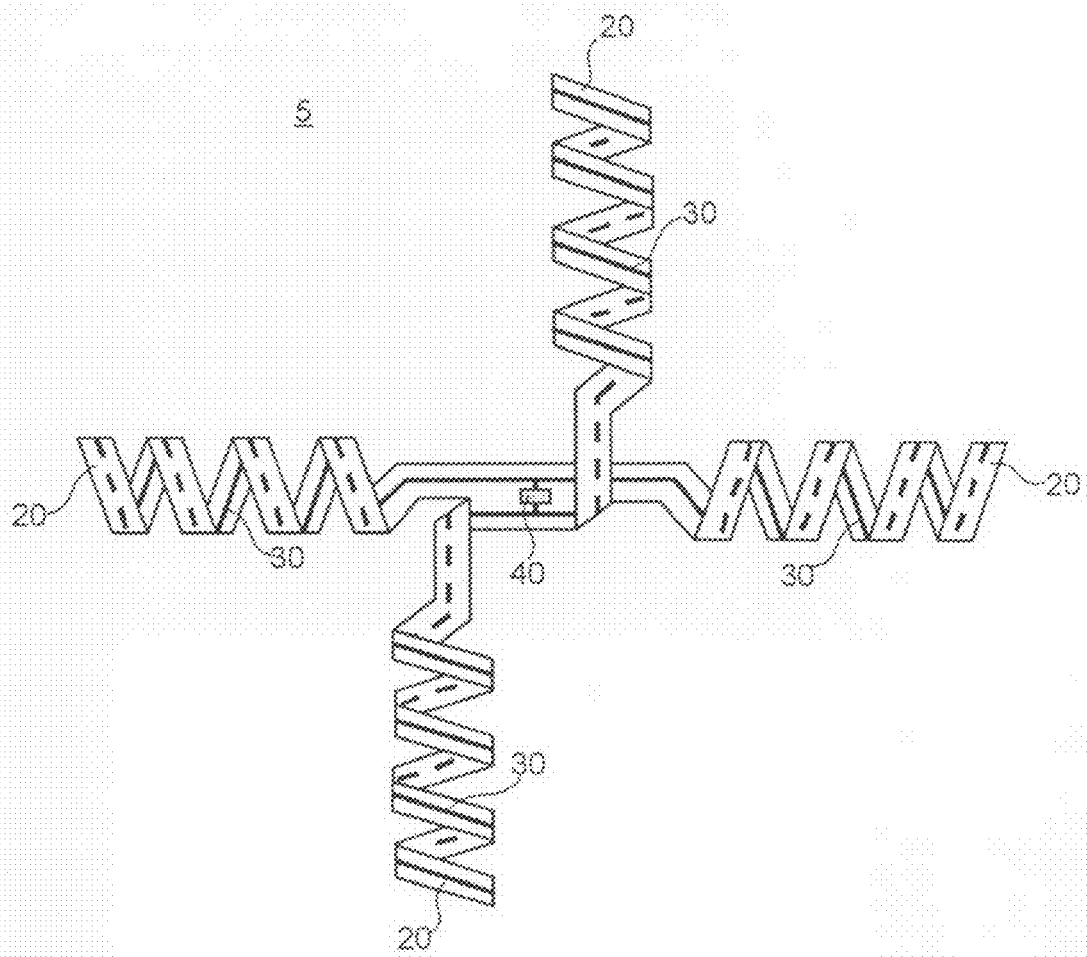
FIG. 16 is a plan view of an RFID tag that has a helical antenna.

FIG. 14 is a top plan view of an RFID tag antenna according to a ninth embodiment of the present invention, illustrating a process of folding the antenna. FIG. 15 is an explanatory diagram of a process of forming a helical antenna. FIG. 16 is a top plan view of an RFID tag that has a helical antenna.

As shown in FIG. 14, the configuration of the RFID tag antenna 10 according to the ninth embodiment is substantially the same as that (refer to FIG. 1) according to the first embodiment. A main difference is that RFID tag antenna 10 according to the ninth embodiment has four film bases 20 helically formed in four directions, thereby obtaining a helical antenna as shown in FIG. 16.

As shown in FIG. 15, this helical antenna is formed by winding the whole or a part of each film base 20 around a side surface of a pillar 64 at a predetermined pitch, heating the wound result, and then cooling the heated result.

As explained above, according to the ninth embodiment, the RFID tag 5 can secure a sufficiently high production yield from the material like that according to the first embodiment. At the same time, the provision of four helical antennas in substantially a cross shape on the same plane can improve the reception sensitivity of a polarized wave, and secure directivity. Therefore, the antenna performance can be improved substantially.

While the four helical antennas are formed in substantially a cross shape on the same plane according to the ninth embodiment, the antennas can be also formed on different planes.

Figure 17:
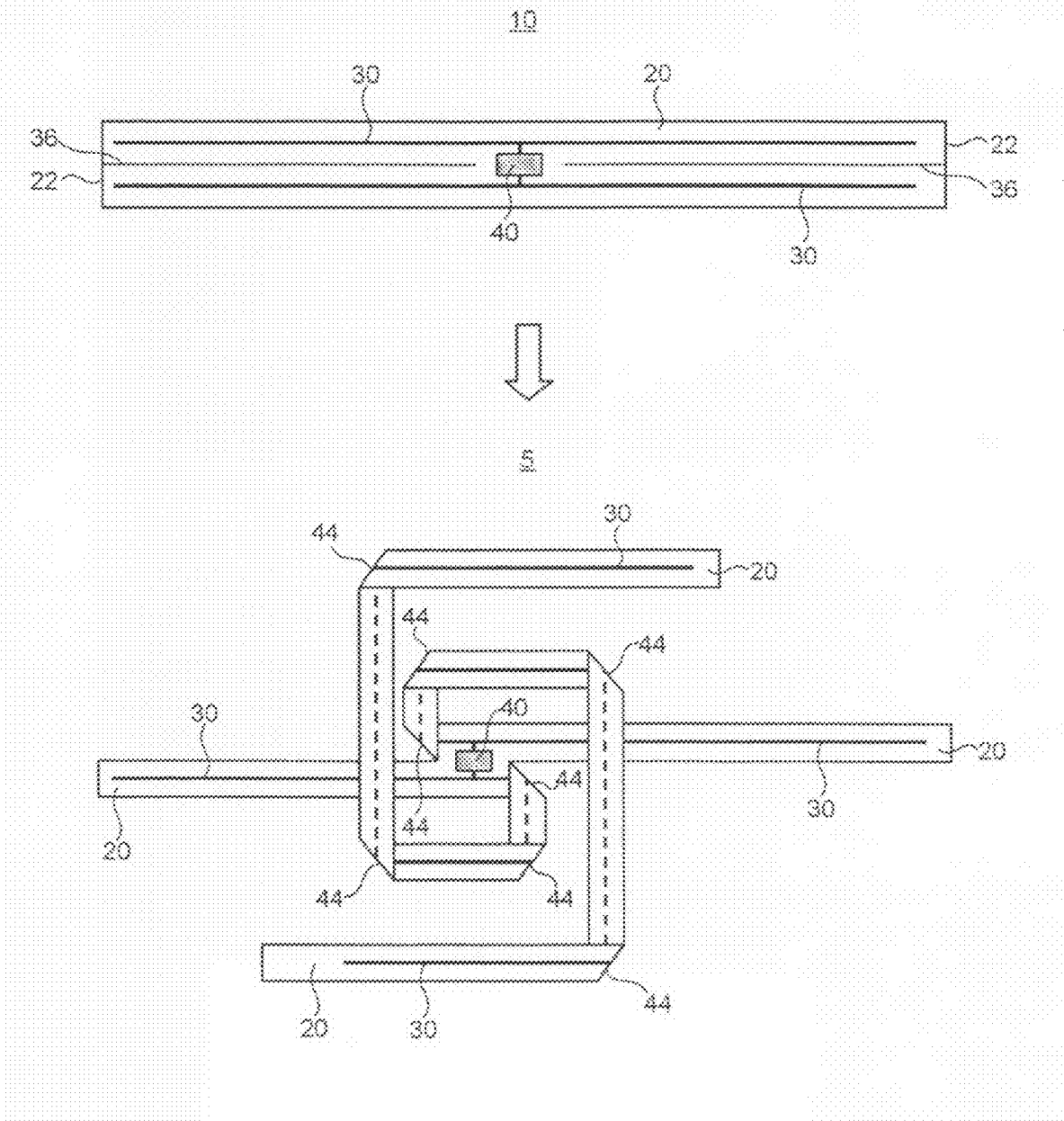
FIG. 17 is a plan view of an RFID tag according to a tenth embodiment of the present invention, illustrating a process of forming the RFID tag.
Figure 18:
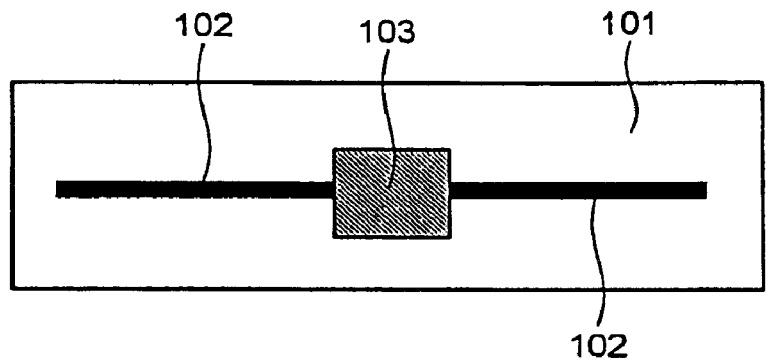
FIG. 18 is a plan view of a conventional RFID tag.
Figure 19:
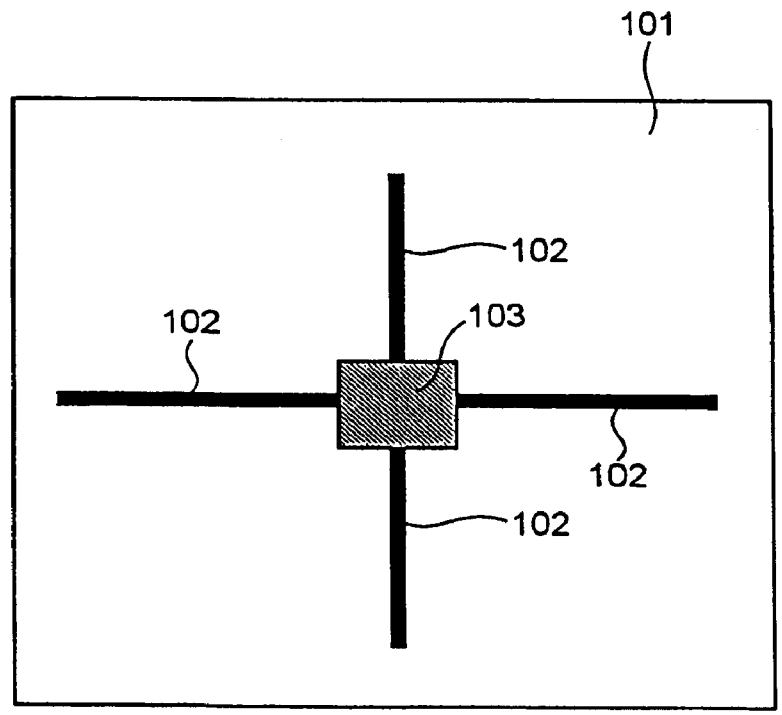
FIG. 19 is a plan view of a conventional RFID tag that has a cross antenna pattern.
Figure 20:
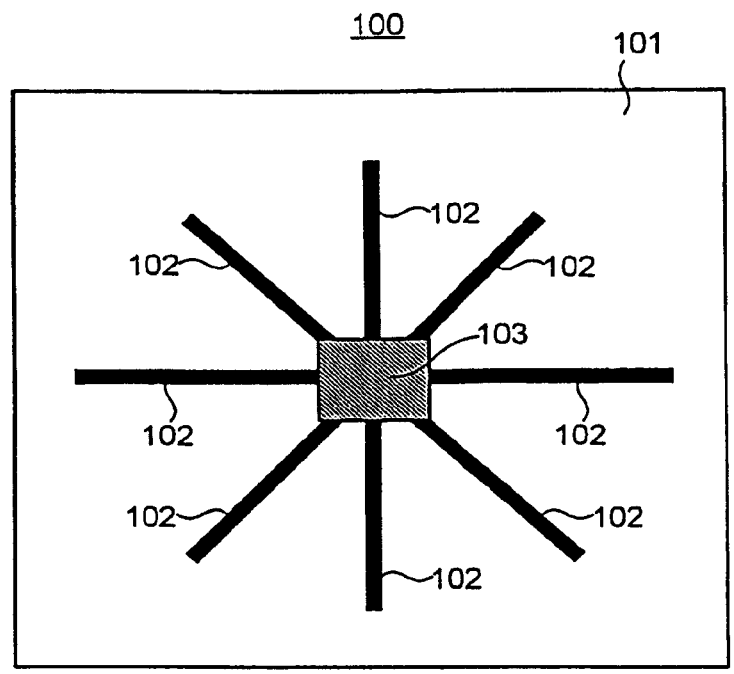
FIG. 20 is a plan view of a conventional RFID tag that has a radial antenna pattern.
Figure 21:
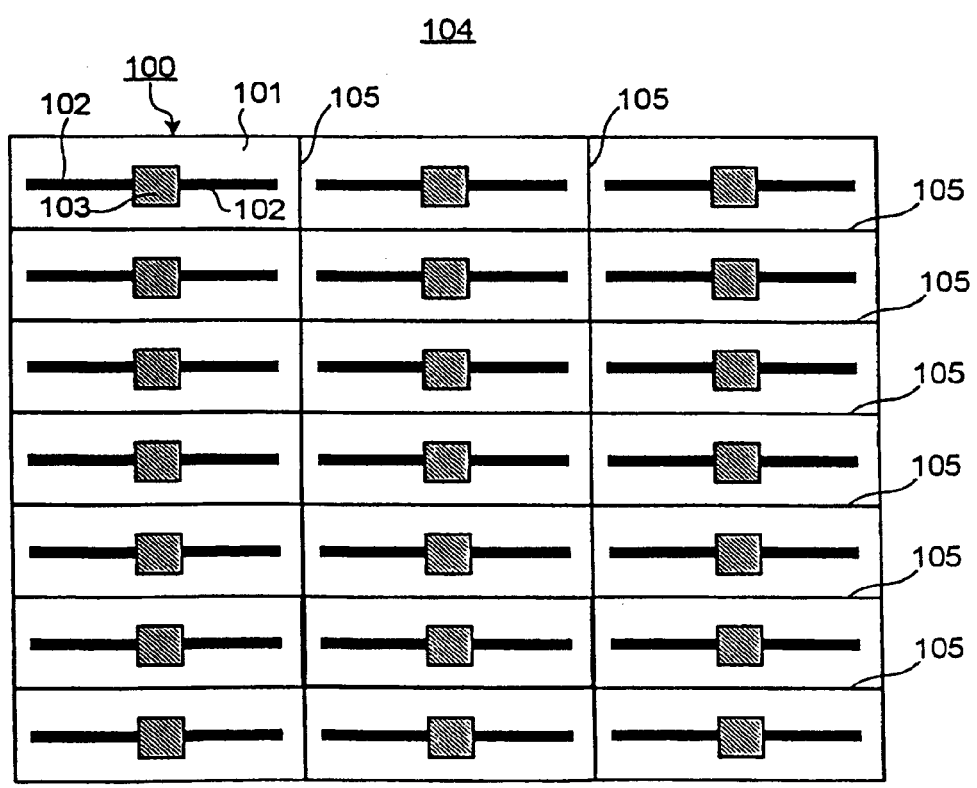
FIG. 21 is a plan view of a sheet on which a plurality of conventional RFID tags is formed.

FIG. 17 is a top plan view of an RFID tag according to a tenth embodiment of the present invention, illustrating a process of forming the RFID tag. As shown in FIG. 17, the configuration of RFID tag antenna 10 according to the tenth embodiment is substantially the same as that (refer to FIG. 1) according to the first embodiment. A main difference is that RFID tag antenna 10 according to the tenth embodiment is formed by combining a dipole antenna and a spiral antenna as shown in FIG. 17.

In other words, when a set of film bases 20 are sequentially folded at the folding sections 44, a spiral antenna is formed by the antenna pattern 30. On the other hand, the antenna pattern 30 of the film base 20 which is not folded functions as a dipole antenna.

As explained above, according to the tenth embodiment, the RFID tag 5 can secure a sufficiently high production yield from the material like that according to the first embodiment. Since the antenna is formed by combining the dipole antenna and the spiral antenna, the antenna performance can be substantially improved.

According to the first aspect of the present invention, a plurality of antenna patterns is formed in parallel on a film base. Therefore, a necessary area of the film base can be reduced. As a result, a sufficiently high production yield can be secured from the material. When the film base is folded or bent in a predetermined direction by using a cut line, a desired antenna shape can be obtained, and a signal reception area of the antenna can be increased. Therefore, an RFID tag antenna that has high antenna performance can be obtained.

According to the second aspect of the present invention, a plurality of antenna patterns is formed in parallel on a film base. Therefore, a necessary area of the film base can be reduced. As a result, a sufficiently high production yield can be secured from the material. When the film base is folded or bent in a predetermined direction by using a cut line, a desired antenna shape can be obtained, and a signal reception area of the antenna can be increased. Therefore, an RFID tag that has high antenna performance can be obtained.

According to the third aspect of the present invention, the antenna pattern and the IC chips can be protected from an external environment such as external force and moisture. Therefore, reliability of the product can be increased.

According to the fourth aspect of the present invention, a large number of RFID tag antennas on the RFID-tag antenna sheet can be cut out efficiently and promptly.

According to the fifth aspect of the present invention, by suitably setting a folding angle or the number of times of folding the film base, plane antennas with a desired shape can be obtained easily.

According to the sixth aspect of the present invention, by suitably setting a folding angle or the number of times of folding the film base, three-dimensional antennas with a desired shape can be obtained easily.

According to the seventh aspect of the present invention, by obtaining a spiral plane antenna, a signal reception area of the antenna can be increased, which improves the antenna performance.

According to the eighth aspect of the present invention, by obtaining a helical three-dimensional antenna, a signal reception area of the antenna can be increased, which improves the antenna performance.

According to the ninth aspect of the present invention, a plurality of antenna patterns is formed in parallel on a film base. Therefore, a necessary area of the film base can be reduced. As a result, a sufficiently high production yield can be secured from the material. When the film base is folded or bent in a predetermined direction by using a cut line, a desired antenna shape can be obtained. Consequently, a signal reception area of the antenna can be increased, and an RFID tag that has high antenna performance can be obtained.

According to the tenth aspect of the present invention, by heating and pressing the film base, a desired antenna shape can be obtained easily. When the film base is cooled, the obtained shape can be maintained without increasing mass.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A radio-frequency-identification tag comprising:
a film base having a rectangular shape and having pads for mounting a chip;
a first antenna pattern and a second antenna pattern that are disposed on the film base to be connected to the chip via the pads for transmission and reception, the first antenna pattern extending along a longitudinal side of the film base, the second antenna pattern extending in parallel with the first antenna pattern; and
a cut line that is formed on the film base between the first and the second antenna patterns along the first and the second antenna patterns from an inside near the pads to an outer edge of the film base,
wherein the second antenna pattern has a folding section and when the second antenna pattern is folded or bent at the folding section, a projection image of the second antenna pattern projected on a plane including the rectangular shape has a portion extending from the rectangular shape in a predetermined direction.

2. The radio-frequency-identification tag according to claim 1, wherein surfaces of the first and second antenna patterns are covered with an insulating member.

3. The radio-frequency-identification tag according to claim 1, wherein the first and second antenna patterns are formed on at least one of a front surface and a back surface of the film base.

4. The radio-frequency-identification tag according to claim 3, wherein when the first and second antenna patterns are formed on both the front surface and the back surface of the film base, conductive through-holes, through which the first and second antenna patterns formed on the front surface and the back surface become conductive, are provided on the film base.

5. The radio-frequency-identification tag according to claim 1, further comprising:
an integrated-circuit chip that incorporates a communication circuit and a memory circuit, the integrated-circuit chip being electrically connected to the first and second antenna patterns via the pads.

6. The radio-frequency-identification tag according to claim 5, wherein surfaces of the first and second antenna patterns and a surface of the integrated-circuit chip are covered with an insulating member.

7. The radio-frequency-identification tag according to claim 5, wherein the film base is folded once or more than once at a predetermined angle so that the first and second antenna patterns together form a plane antenna as a whole.

8. The radio-frequency-identification tag according to claim 7, wherein the film base corresponding to the second antenna patterns are folded more than once so that the second antenna pattern forms a spiral shape as a whole on a substantially same plane.

9. The radio-frequency-identification tag according to claim 5, wherein the film base is folded once or more than once at a predetermined angle so that the first and second antenna patterns are non-coplanar and form a three-dimensional antenna as a whole.

10. The radio-frequency-identification tag according to claim 9, wherein the corresponding film base is bent helically so that a part of or the whole antenna has a helical shape.

11. The radio-frequency-identification tag according to claim 9, wherein both ends of the film base including the first and second antenna patterns are connected together to form a loop antenna by electrically connecting the both ends of the first and second antenna patterns that extend on a same straight line.

12. The radio-frequency-identification tag according to claim 11, wherein the both ends of the first and second antenna patterns to be connected are coated with a conductive adhesive that exhibits a predetermined adhesive force by pressing and heating.

13. The radio-frequency-identification tag according to claim 5, wherein the first and second antenna patterns are formed on at least one of a front surface and a back surface of the film base.

14. The radio-frequency-identification tag according to claim 13, wherein when the first and second antenna patterns are formed on both the front surface and the back surface of the film base, conductive through-holes, through which the first and second antenna patterns formed on the front surface and the back surface become conductive, are provided on the film base.

15. The radio-frequency-identification tag according to claim 5, wherein the pads are connected to electrodes of the integrated-circuit chip.

16. A method of manufacturing a radio-frequency-identification tag, comprising:
forming pads for mounting a chip and a first antenna pattern and a second antenna pattern for transmission and reception in parallel on a film base having a rectangular shape, such that the first antenna extends along a longitudinal side of the film base, and the second antenna pattern extends in parallel with the first antenna pattern;
connecting electrically an integrated-circuit chip that incorporates a communication circuit and a memory circuit, onto each of the first and second antenna patterns;
forming a cut line on the film base between the first and second antenna patterns along the first and second antenna patterns from an inside near the pads to an outer edge of the film base; and
forming a desired shape of an antenna by folding or bending the film base including the second antenna pattern so that a projection image of the second antenna pattern projected on a plane including the rectangular shape has a portion extending from the rectangular shape in a predetermined direction.

17. The method according to claim 16, further comprising covering the integrated-circuit chip and the first and second antenna patterns with an insulating member, between the connecting and the forming the cut line.

18. The method according to claim 16, wherein the film base is formed with a thermoplastic material, and at the forming the desire shape, the film base is heated and pressed to fold or bend the film base.

* * * * *